INVENTORS
JOHN G. BAYLY
WILLIAM H. STEVENS

INVENTORS
JOHN G. BAYLY
WILLIAM H. STEVENS

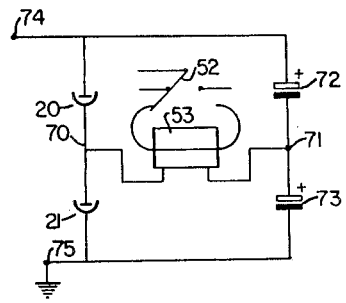
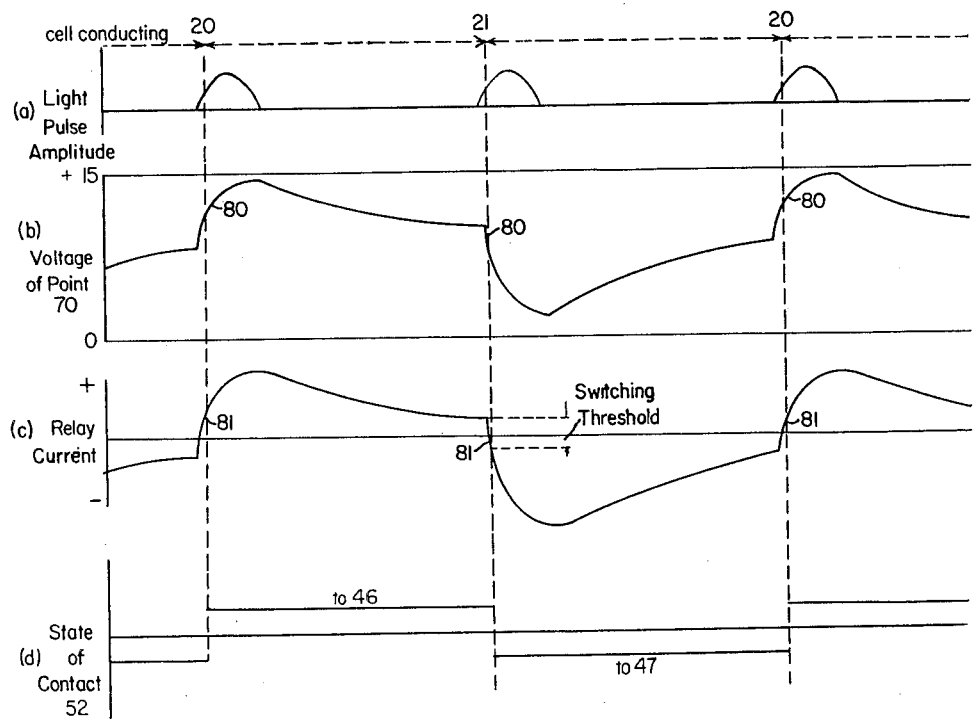
Fig. 4
Fig. 5

Oct. 12, 1965　　　J. G. BAYLY ETAL　　　3,211,961
APPARATUS FOR DETERMINING THE QUANTITY
OF CONTAMINANT IN A SUBSTANCE
Original Filed May 12, 1961　　　　　　　6 Sheets-Sheet 5

INVENTORS
JOHN G. BAYLY
WILLIAM H. STEVENS

By
Cushman, Darby & Cushman
ATTORNEYS

INVENTORS
JOHN G. BAYLY
BY WILLIAM H. STEVENS

Cushman, Darby & Cushman
ATTORNEYS

United States Patent Office 3,211,961
Patented Oct. 12, 1965

3,211,961
APPARATUS FOR DETERMINING THE QUANTITY OF CONTAMINANT IN A SUBSTANCE
John G. Bayly and William H. Stevens, Deep River, Ontario, Canada, assignors to Atomic Energy of Canada Limited, a corporation of Canada
Original application May 12, 1961, Ser. No. 109,533, now Patent No. 3,153,722, dated Oct. 20, 1964. Divided and this application May 3, 1963, Ser. No. 285,172
4 Claims. (Cl. 317—127)

This application is a division of my copending application, Serial No. 109,533, filed May 12, 1961, now Patent No. 3,153,722, and is entitled to the filing date thereof.

This invention relates to the measurement of the contamination of a substance by its ability to transmit infrared or visible or ultra-violet radiation and is particularly directed to the measurement of the concentration of isotopic impurities in water or heavy water.

Heavy water is the best moderator for nuclear reactors, but it does have the disadvantage of high cost. To minimize this disadvantage it is necessary to avoid both loss of heavy water and dilution with ordinary water. At present the loss of one gallon of heavy water means a loss of some $300. Light water leakage into the heavy water is much more expensive; the addition of a gallon of light water to a power reactor's moderator may cost about $2,000 per year as a result of loss of reactivity. The conservation and the maintenance of the moderator's purity are therefore of considerable importance.

After the heavy water system has been designed with the joints and glands and heat exchangers as good as they can be, it is still necessary to monitor the water purity so that if a fault does develop it can be detected and corrected before too much loss has occurred.

Heavy water can be lost by leakage to the atmosphere in the vapour phase or as liquid which subsequently evaporates, and by leakage into light water, as for example in a perforated heat exchanger. Both forms of loss can be important economically, but the loss to the atmosphere is especially important since the water carries with it tritium, which can be a health hazard. In either instance the heavy water which escapes becomes diluted with light water, and to detect it, the isotopic purity of the mixture must be measured. This leads to the need for an instrument which can detect the addition of ten parts of heavy water to a million parts of light water.

At the other end of the concentration range, an instrument is needed for monitoring the isotopic purity of the moderator in the reactor. The concentration is typically 99.8% $D_2O$, and a detection level of 10 parts of light water per million of heavy is required.

Since these monitors must operate continuously in an industrial environment, simplicity, reliability and ease of maintenance are important.

Most of the methods by which heavy water can be detected depend on the very small physical differences between it and ordinary water. Substitution of deuterium for hydrogen in the water molecule changes its density, refractive index, melting and boiling points. Any of these properties can be used to measure its purity. Unfortunately all of these effects are small. To detect ten parts per million one would have to detect a density change of one part per million, or a freezing point change of $10^{-4}$° C. for example. These methods are quite impractical, execpt in the laboratory, since small amounts of dissolved materials can mask such minute effects.

There are three methods which depend on two of the major differences between the two hydrogen isotopes; that is on their mass difference and on their different magnetic properties.

Deuterium, the heavy isotope, weighs twice as much as ordinary hydrogen, and has a much smaller nuclear magnetic moment. The magnetic moments can be used as the basis of an analyser, since in a given magnetic field the deuterium nuclear magnetic resonance occurs at a frequency 6½ times lower than that of hydrogen. But the method is difficult to apply, and expensive.

The differences in mass lead to the two practical methods of analysis, the mass spectrometer and the infra-red analyser. The mass spectrometer method, in which hydrogen gas is analysed, is the standard absolute laboratory method. The infra-red method is based on the different vibration frequencies of hydrogen and deuterium when chemically bonded to oxygen in the water molecule. Since deuterium is heavier, the molecules containing OD bonds vibrate at lower frequencies than those containing OH bonds. The resonances which are most useful occur in the infra-red region.

In thin layers, both kinds of water are transparent in the visible region. There is a very strong absorption resonance in light water at a wavelength of $3\mu$ ($1\mu=1$ micron$=10^{-6}$ meters) and a corresponding absorption at $4\mu$ in heavy water. The $3\mu$ region is used for measuring the light water impurity in heavy, and the $4\mu$ region is used for detecting extra heavy water in ordinary water.

In the resonance absorption method, infra-red radiation is passed through a cell containing a thin layer of water between two windows and the intensity of the transmitted light is measured with a wavelength sensitive detecting system. The intensity transmitted at one of the resonances can be compared with the intensity at the same wavelength, thereby measuring the percent transmission, or the intensity of the emerging beam can be measured at several different wavelengths and the spectral distribution of the transmitted light determined. There are thus two quite different techniques: (a) the percent transmission method, using one wavelength and two light paths, one through the cell and one by-passing it, and (b) the spectral distribution method using two or more wavelengths, with all the light passing through the cell.

For the analysis of liquids which should not, but usually do, carry various types of dirt entrained or in suspension, the single beam multiple wavelength instrument has a great advantage. Foreign particles reduce the intensity but rarely change the spectral distribution and are unlikely to cause errors in the analysis.

The required amount of infra-red radiation can be obtained either from a small high intensity source or from a larger source operating at a lower temperature. The choice of source is usually dictated by the optical system, but the high intensity source is likely to be more expensive to make and control.

Commercially available analysers are usually general purpose instruments in which the wavelength sensitivity is obtained by a prism or grating, and the detector is a heat sensitive device like a thermocouple. These instruments have the advantage of being useful over a wide range of wavelengths—to $15\mu$ or more but their optical complexity makes them expensive and in some instances, unreliable.

It is an object of the present invention, to overcome many of the difficulties associated with prior contaminant measuring instruments and there is provided, an apparatus which is little affected by entrained dirt and bubbles, which employs a simple optical system and can be made compactly, ruggedly and inexpensively.

More particularly, according to the present invention, there is provided, an apparatus for determining the quantity of contaminant in a substance wherein the uncontaminated substance has a transmission in at least part of the ultra-violet, visible, and infra-red spectrum and wherein said contaminant shows absorption in said part, which comprises, a radiation source, a sample of contaminated substance for irradiation by said source, at least two filters mounted to be presented in sequence to intercept radiation from said source transmitted by said contaminated substance, one of said filters being adapted to pass the radiation in a wavelength band transmitted by said uncontaminated substance but at least partially absorbed by the contaminant and the other of the filters adapted to pass radiation transmitted by said uncontaminated substance in a wavelength band other than that absorbed by the contaminant, a detector for intercepting radiation from said source passing through said sample and transmitted by each said filter respectively, means for obtaining output from said detector when said detector is illuminated by intercepted radiation, integrating means, means for presenting said output occasioned by said one filter and said output occasioned by said other filter in opposite phases to said integrating means to obtain the integral of said opposite phase outputs, and means sensitive to said integrating means for varying the amplitude of at least one of said outputs in a sense to balance said outputs.

One embodiment of the invention will now be described and reference will be made to the drawings in which:

FIGURE 4 shows a schematic diagram of a circuit for operating the relay of FIGURE 3;

Figure 3:
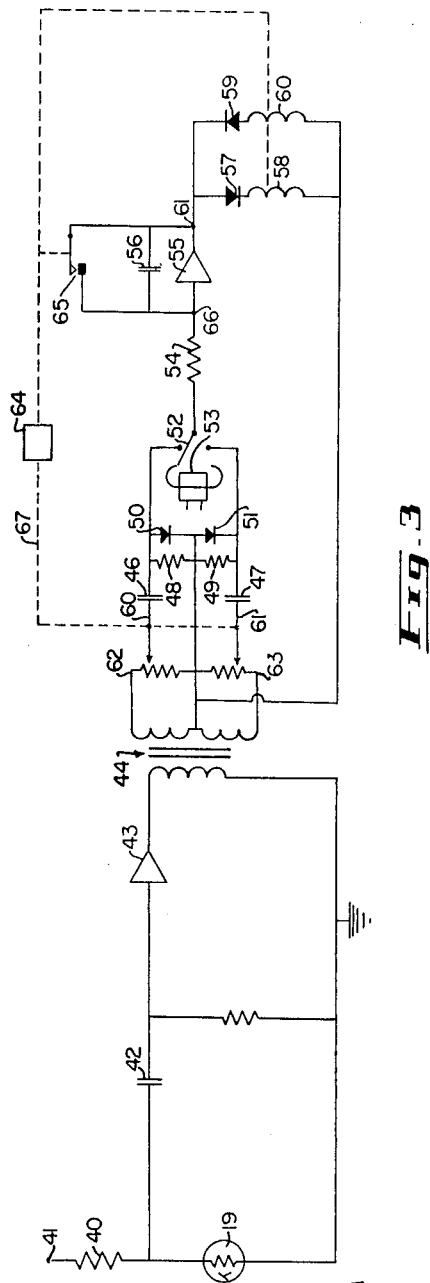
FIGURE 3 shows a schematic diagram of the circuit associated with the infra-red and photo cells of FIGURE 2.
Figure 6:
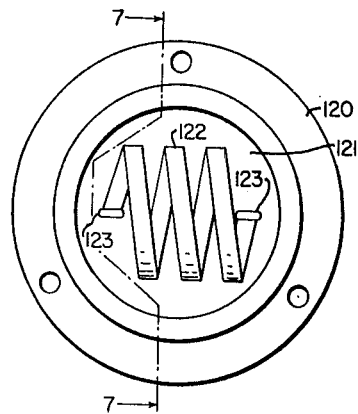
Figure 7:
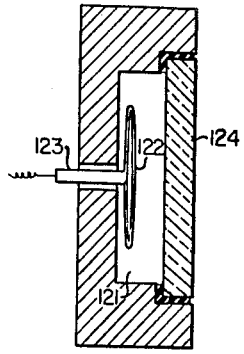
Figure 8:
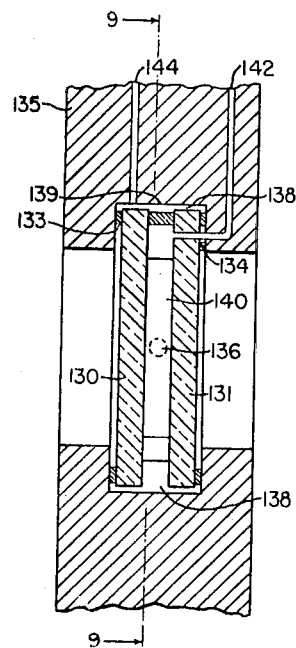
Figure 9:
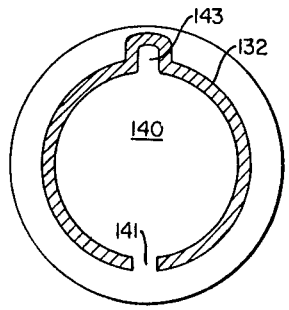
Figure 10:
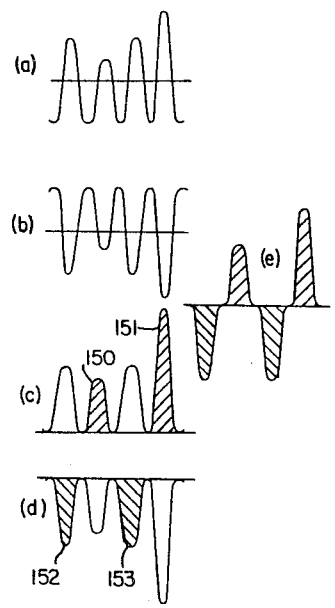
Figure 11:
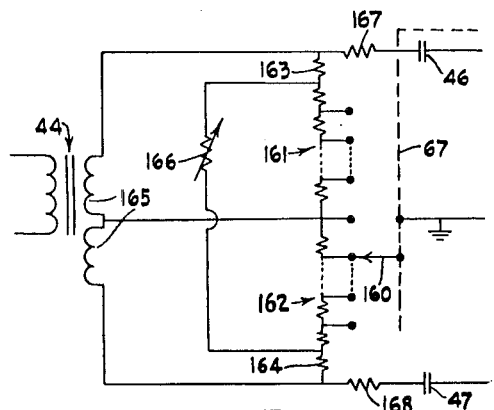

FIGURES 5a, 5b, 5c, and 5d show graphs on the same time base of conditions in the circuit of FIGURE 4;

FIGURE 6 shows a front view of an infra-red source for use in practising the invention;

FIGURE 7 shows a section along lines 7—7 of FIGURE 6;

FIGURE 8 shows a sectional view of a cell for containing a sample of water to be analysed;

FIGURE 9 shows a section on line 9—9 of FIGURE 8;

FIGURES 10a, 10b, 10c, 10d and 10e show waveforms associated with the circuit of FIGURE 3; and FIGURE 11 shows an alternative circuit for that associated with the transformer of FIGURE 3.

Figure 1:
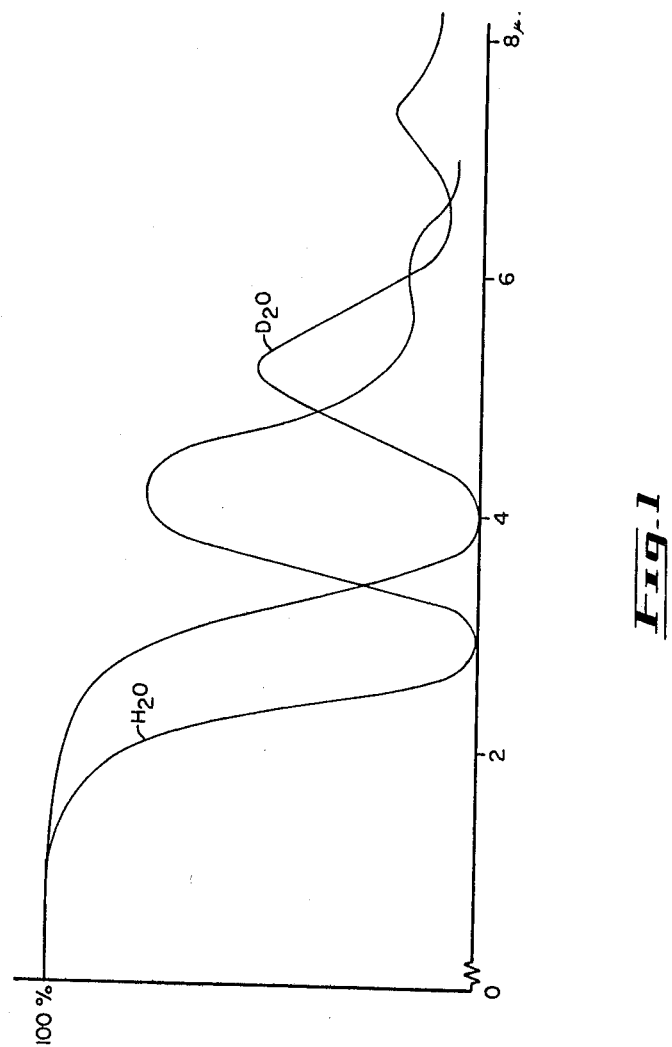
FIGURE 1 shows two graphs of the percentage of electromagnetic energy transmission of an incident beam against wavelength for light water and heavy water respectively.

In FIGURE 1, the graphs show predominately that there is strong absorption in the region of $3\mu$ for light water whereas for heavy water, there is relatively little absorption until $4\mu$ is reached.

In the embodiment of the invention to be described, it is proposed to detect the quantity of light water in a sample of heavy water by measuring the absorption at 2.5, 3 and $3.5\mu$. Thus the transmission intensity at both longer and shorter wavelengths than that at which the impurity absorbs is detected. By averaging the transmission at 2.5 and $3.5\mu$ and comparing this with the average transmission at $3\mu$ a determination of the purity can be made which is little affected by the ambient temperature, overall changes of transmission at the several measured wavelengths due to variations of source intensity etc. These overall changes of transmission are affected in the same proportion and do not thus appear in the final transmission reading.

Figure 2:
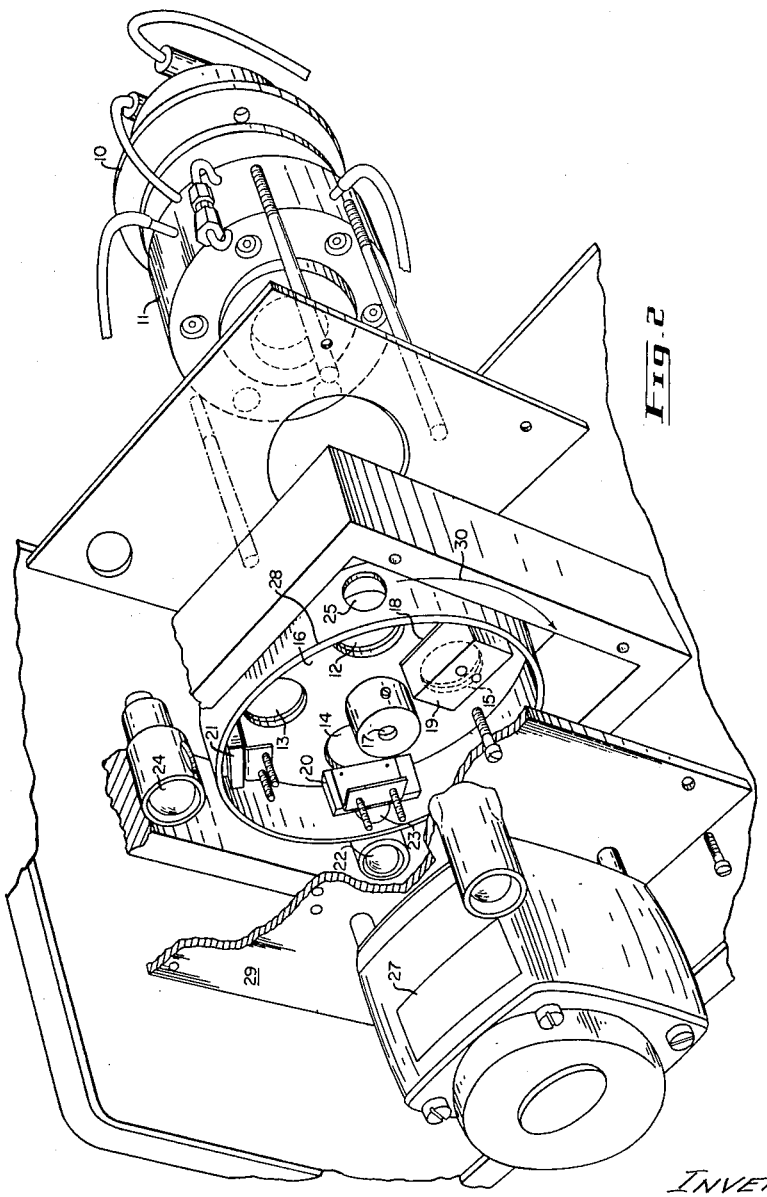
FIGURE 2 shows an exploded 3-dimensional sketch of the apparatus for presenting a series of different filters to an infra-red beam passing through a sample containing a contaminant.

In FIGURE 2, a broad area source of infra-red radiation 10 is directed so that a beam of radiation which need not be collimated, is passed, firstly through the sample cell 11 and then through one of the Fabry-Pérot interferometer filters 12, 13, 14 and 15 mounted over holes or windows in disc 16 which is driven by a motor 27 to revolve about an axle 17 in a plane at right angles to the direction of transmission of the infra-red beam. The filters comprise two semi-transparent reflecting layers separated by a transparent medium whose thickness is equal to half the wavelength of light to be transmitted. Where the width of infra-red absorption bands as in water, is fairly great, there is no need for high resolution in the wavelength analysis, and Fabry-Pérot filters are therefore quite suitable, being easily obtainable with a band width of about $.2\mu$ to $.3\mu$. It is sometimes necessary to use an auxiliary filter with the primary band pass filter to suppress spurious transmission outside the range required but this is accepted construction technique for this type of filter and will not be detailed here. Since the transmission spectrum of these filters is only slightly affected by the angle of incidence of the radiation, the uncollimated radiation beam which is used is quite acceptable. The beam passes through the filters in the windows in disc 16 then through a long wave pass filter 18 and impinges upon infra-red sensitive cell 19. Filter 18 is affixed to cell 19 which in turn is mounted on motor supporting plate 29. Cell 19 has high sensitivity and thus also makes the use of uncollimated light possible. The distance from source 10 to cell 19 is normally not more than about 2½ inches. The filters 12, 13, 14 and 15 for the testing of a sample mentioned above are of $3.0\mu$, $2.5\mu$, $3.0\mu$ and $3.5\mu$ respectively. The long wave filter is somewhat similar in construction to the Fabry-Pérot filter and is arranged to cut off wavelengths shorter than $2\mu$. Details of filters suitable for 12, 13, 14, 15 and 18 are given in the Progress Report No. 3 dated September 8, 1958 entitled, "Infra-Red," and published by the Bausch and Lomb Optical Company, Rochester 2, N.Y., U.S.A. Other filters using the same basic principle are made by Bausch and Lomb and are available so as to cover the range of $0.2\mu$ to $6\mu$. Filters can thus be obtained for the spectrum from ultraviolet into much of the infra-red range. The quantity of radiation transmitted through any one of the filters can be altered by interposing a metallic mesh screen with the filter or by changing the aperture of the filter. A suitable cell 19 comprises a layer of lead selenide (PbSc) about two centimeters long and one centimeter wide deposited on a glass plate. This is commercially available from Eastman Kodak Company of Rochester, N.Y., U.S.A., sold under the mark "Ektron" with type number R–2, shows a decrease in resistance when illuminated by light of wavelength less than $4.5\mu$ and has a useful response through the visible region and the infra-red region to $4.5\mu$. If dealing with wavelengths shorter than $3\mu$ cell 19 would preferably be a lead sulphide (PbS) detector (Ektron type N or P). The cell 19 is connected to the amplifier and associated equipment shown in FIGURE 3 and discussed later.

It may sometimes be found desirable to place a metal electrically conducting screen on the inner surface of disc 16 to make this an equipotential surface, or to place a Farady screen around the detector cell 19 suitably grounded to the body of the apparatus, to prevent electrostatic coupling between the detector and rotating filters which could disturb the output from the detector. The screen should be sufficiently transparent that it does not seriously block the infra-red radiation. When the flow into and from cell 11 is slow, substance in cell 11 is liable to be heated by the radiation from source 10 and it is then desirable to insert a prefilter between the source and cell to remove all radiation of wavelength longer than that used in the measurements. In the embodiment being described, this would be longer than 3.5μ but preferably longer than 3.7μ.

Within the rim flange 28 of disc 16 and fixed to the motor supporting plate 29 are two cadmium sulphide (CdS) photoconductive cells 20 and 21 spaced apart by one quarter of the circumference of flange 28. Each cell can be illuminated respectively by a light bulb 22 and 24, through holes 23 and 25 in flange 28. In the position shown in FIGURE 2, light falls on cell 20 from light 22 by passing through hole 23. After a quarter revolution of disc 16 (whose direction of rotation is shown by arrow 30) bulb 24 can illuminate cell 21 through hole 23. After a further quarter revolution cell 20 is again illuminated but this time through hole 25. In this way, at each quarter revolution of the disc 16 one or other of the cells 20 and 21 rectives a pulse of light from lamp 22 or 24.

The photocells 20 and 21 consist of a thin layer of sensitized cadmium sulphide on an insulating base connected between metallic electrodes, specific details of them may be gleaned from the publication of National Semiconductors Limited, 146 Bates Road, Montreal 26, P.Q., Canada, entitled, "Cadmium Sulphide Photoconductive Cells." These cells have a spectral response similar to that of the human eye and their resistance decreases when they are illuminated. The particular cells used in the embodiment described in this application were National Semiconductors Limited, Type PC1–05.

In the circuit of FIGURE 3 the infra-red cell 19 is connected through a load resistance 40 to a suitable source of direct potential 41. An output from this detector cell is obtained through the D.C. isolating condenser 42 and fed through amplifier 43 which produces two outputs in opposite phases from an output transformer 44 which acts as a phase splitter. Opposite phase outputs are thus obtained from potentiometers 62 and 63 respectively connected across the output windings of transformer 44, through condensers 46 and 47. Each condenser is followed by a high resistance leakage bleeder 48 and 49, respectively shunted by a D.C. restoring diode 50 and 51. The output from one or other of the condensers 46 or 47 is selected alternately by moving contact 52 of a single pole two throw relay 53 (the Clare polarised bi-stable rely HGS 1019 being suitable), operated by the photocells 20 and 21 in a manner to be described. The sliding contacts 60 and 61 of potentiometers 62 and 63 are ganged together and arranged to be driven by shaft 67 of a motor 64 so that when the output on slider 60 increases, the output from 61 decreases and vice versa. A suitable device for the motor 64 and combined potentiometers 62 and 63 is sold under the name "Bothway" by the General Electric Company Limited. The Bothway is basically an impulse motor in which a shaft is rotated through a specific small angle every time one of its operating windings is energized. In the circuit of FIGURE 3 an impulse through its winding 58 will move the shaft in one direction and one through 60 in the opposite. Two wipers are carried by the shaft and engage separate insulated contacts spaced round the paths over which the wipers travel. Individual resistance elements are connected between adjacent contacts in each wiper path. Thus these elements being connected in series represent the resistive parts of the potentiometers 62 and 63, and the wipers represent the sliders 60 and 61 being mechanically coupled to the shaft of the Bothway. In many instances, it will be satisfactory to couple only one slider to the shaft 67, the other slider being preset manually. As another alternative the manual slider may consist of a "wander" lead for insertion in a series of sockets replacing the contacts of the Bothway. In this way, the lead becomes a coarse preset adjustment.

The contact 52 feeds an integrating circuit comprising resistor 54 and high gain amplifier 55 applying negative feed back through condenser 56, in which point 66 forms a virtual earth. Amplifier 56 at output 61 feeds a rectifier 57 series connected to advancing winding 58 of the Bothway and a rectifier 59 series connected with reversing winding 60. Since rectifiers 57 and 59 are connected in opposite senses, current will be available to move the Bothway in one direction if the potential of 68 becomes positive or in the opposite direction if it becomes negative. The Bothway is also so constructed that whenever it moves due to a sufficient potential at point 61 the condenser 56 is short circuited by a switch 65 so that integration can begin again with no residual charge on the condenser 56.

In FIGURE 4, the relay 53 is connected between the junction point 70 of the photo-conductive cells 20 and 21 and the junction point 71 of two electrolytic condensers 72 and 73. Cell 20 and condenser 72 are fed from a point of positive potential 74, suitably 15 volts with respect to earth point 75. The operation of this circuit will now be explained with reference to FIGURE 5.

FIGURE 5a depicts the amplitude of incident light radiation on photocells 20 and 21 alternately. FIGURE 5b shows the voltage of the junction point 70 on the same time base as FIGURE 5a. FIGURE 5c shows the current through relay 53 again on the same time base and finally FIGURE 5d shows the state of contact 52. The cells chosen for 20 and 21 are particularly suitable in this application, since an excited cell continues to conduct for a considerable period after it has received a light pulse. This results in a latching action which augments the tendency of the relay to remain in the state to which it has been driven. For a typical cell, the conductivity after an exposure to an illumination of 5 foot candles is still 25% of its initial value, 50 milliseconds after the exposure ceases. There is however, a rapid switching threshold as shown by the gradient of the curves in regions 80 and 81, because the rate of increase of conductivity upon illumination is more rapid. The potential of point 71 is maintained at a value between 74 and 75 and varies little as the current flows through relay 53 being effectively clamped by the capacity to earth 75 through condenser 73 and (via the low impedance source between 74 and 75) through condenser 72. The actual potential of point 71 will depend upon the matching of cells 20 and 21. In general the cells are not identical and the potential will have a value such that the time integral of the relay current in the positive direction will equal that in the negative direction, that is, so that the areas under the positive and negative curves in FIGURE 5c are equal. It will be seen therefore, that moving contact 52 is alternately connected to condensers 46 and 47 in the manner shown in FIGURE 5d. Holes 23, 24, 25, 26 are so placed so that switching occurs during the period in which radiation from the cell 11 is blocked by the opaque portions of the disc 16 between the filter windows 12, 13, 14 or 15.

In FIGURES 6 and 7 is shown the structure of infrared source 11. This comprises a metallic housing 120 into which is let cavity 121. In this cavity is mounted a flat spiral 122 of resistive ribbon not easily melted, evaporated or corroded, such as Nichrome, mounted on insulated conducting pins 123. Pins 123 are connected to a source of current through the rear of the housing 120 and the cavity is closed by a quartz window 124, and sealed by caulking 125.

Details of the cell for containing the sample of heavy water are shown in FIGURES 8 and 9. Having reference to FIGURE 8 two quartz or sapphire window plates 130 and 131 are separated by a spacer 132 of lead or other suitable soft material which will not introduce impurities. The two window plates are sealed at their outer portions by caulking 133 and 134 within an annular supporting member 135. A hole 136 and a corresponding one 137 (not shown) are formed in opposite sides of the supporting member 135 for leading fluid into the compartment 138 formed between the quartz plates, the lead gasket, and the outer surface 139 of the ring shaped cavity in the member 135 for feeding water for analysis into the specimen space 140 of the cell. As can be seen from FIGURE 9, this space 140 is defined by the spacer 132, water being able to enter through opening 141 and leave via pipe 142 connecting to horse-shoe shaped cavity 143. Any incidental air bubbles arriving through hole 136 will tend not to enter the opening 141 being bled away from the top of cavity 139 through a pipe 144. Liquid entering the cell space 140 is removed through pipe 142.

Let us now assume that sample water is led into cell 11 and the disc 16 is rotated:

Having reference to FIGURES 3 and 10, the waveform appearing on slider 60 will be as shown in FIGURE 10a and on slider 61 as shown in FIGURE 10b. The D.C. restoring diodes 50 and 51 are connected so as to establish a base for these pulses and thus waveforms as shown in FIGURE 10c and FIGURE 10d respectively are available for selection by moving contact 52. In this instance, let us assume that pulses 150 and 151 will be selected from the waveform in FIGURE 10c and 152 and 153 from the waveform in FIGURE 10d. The output therefore appearing on slider 52 which is fed to the integrating circuit is that shown in the waveform of FIGURE 10c.

The sign of the time integral of the graph shown in FIGURE 10e, determines the sense of rotation of motor 64 which therefore always seeks to maintain a balance between the pulses produced by transmission through sample 11 at $3\mu$ and the average of that at $2.5\mu$ and $3.5\mu$. The position of the shaft 67 of the motor 64 is a direct indication of the contamination of the sample in cell 11. If the contamination increased, the amplitude of pulses 152 and 153 would decrease with respect to those of pulses 150 and 151, the motor shaft 67 would thus turn so as to increase the output on slider 61 and reduce that on slider 60. A digital output may be taken from the Bothway to provide positive pulses at each step of the slider in one direction and a negative at each step in the other. These outputs may thus feed a digital display unit. The potentiometers 62 and 63 need not be linear and can be wound to produce large variations of output to sliders 60 and 61 at the limits of the range of impurity to be expected, and small variations in the centre of the range. In this way, the shaft 67 will be quickly brought to the approximate final reading and will be more sensitive over the range considered, since small variations in impurity concentration will produce large movements of shaft 67. Alternatively, one of the potentiometers 62 or 63 as mentioned before, may be operated manually as a "zero adjusting" control, when setting up the apparatus. The shaft 67 will then only move the slider of the other potentiometer.

An alternative to the circuit associated with transformer 44 in FIGURE 3 is shown in FIGURE 11. In this circuit resistors 163, 161 and 162 and 164 are connected in series across the output winding 165 of transformer 44. The centre top of winding 165 is connected to the junction of resistors 161 and 162. These resistors 161 and 162 are formed of a plurality of series connected resistors of relatively small value between adjacent insulated contacts on the Bothway, and are engaged in turn by a wiper 160 grounded and connected to the shaft 67. A variable resistor 166 shunts the series connected 161 and 162. A resistor 167 and a variable resistor 168 are connected between the outer ends of winding 165 and condensers 46 and 47 respectively. The network of resistors 163, 161, 162, 164 and 166 forms a divider which has an effect similar to grounding a movable tapping on the winding 165 and since this "effective ground" is determined by the position of wiper 160 the ratio of the amplitudes of signals fed to condensers 46 and 47 varies accordingly. The resistor 166 controls the range of ratios developed by wiper 160 and resistor 168 is a zero adjustment.

This circuit has the advantage that the output voltage from the transformer is used without attenuation, there is a low output impedance to condensers 46 and 47 and the range and zero controls 166 and 168 are essentially independent of one another.

Although only specific embodiments of the invention have been described, the apparatus may be applied to any infra-red monitoring problem in which (a) the resonances occur at less than $4.5\mu$ and (b) are relatively broad, i.e., $0.1\mu$ or more. The presence of heavy water in light water may be detected by changing the filters and working around the $4\mu$ absorption characteristic of water molecules containing the OD bond. Specifically filters 12 and 14 would be replaced by ones transmitting at $4\mu$, filter 13 by one transmitting at $3.5\mu$ and filter 15 by one at say $4.3\mu$. The wavelength limit at $4.5\mu$ is set by the interference filters and the photo-conductive detectors readily available at present. Thus the shaft of motor 64 would indicate the absorption at $4\mu$. If operation at greater wavelengths is contemplated other types of filters and a cooled detector cell 19 might be required.

In most heavy water moderated reactors, the presence in the air of tritium, the third hydrogen isotope, is associated with leakage of heavy water to the atmosphere. Monitoring the air for heavy water vapour is a good way of detecting both the loss of the valuable water and the contamination of the air by a radioactive poison. The moisture extracted by compressing and cooling the air can be analysed for its heavy water content. The amount of tritium in the air can be measured by this method since the tritium deuterium ratio of the moderator when in the reactor is known. This system can detect much less than the permissible tolerance amount of tritium. It has an advantage over methods which use the radioactivity of tritium in that fluctuating or high background activity does not interfere with its action.

The rate of rotation of disc 16 is not critical, and in a prototype apparatus this was approximately 280 r.p.m. In general, this might be increased or decreased by one order of magnitude, but higher speeds would require modifications to the control system for relay 53, and reduce the life expectancy of the motor for rotating the disc. Lower speeds would require the amplifier 43 and its output transformer 44 to cope with awkwardly low frequencies without distortion.

The relay 53 and its control system may be replaced by a moving contact operated by the turning of the disc 16 so that at each quarter turn of this disc, the contact selects the output available from condenser 46 and 47 alternately, such contact which replaces contact 52 may be moved by a cam on axle 17 by known means. It is not believed however, that a mechanically operated switch could compete in cost or reliability with the relay 53 and circuit of FIGURE 4.

To this point, the specific description has been of substances showing transmission in the infra-red portion of the spectrum, but use of the apparatus may in certain cases be extended to the measurement of transmission, in the visible and even ultra-violet spectrum provided the contaminant shows absorption over the part of the spectrum in which the parent substance or solvent shows transmission. It is only necessary to change the filters 12, 13, 14 and 15 so that 12 and 14 transmit at the absorption wavelength of the contaminant and 13 and 14 adjacent this wavelength within the transmission spectrum of the solvent, and to make sure that cell 19, screened if necessary by filters such as 18, will be responsive to the wavelengths employed.

In some cases it will be satisfactory to employ only two filters mounted in disc 16, one filter transmitting at the contaminant absorption wavelength and the second, within the solvent transmission spectrum near that of the first. It is preferable that the second wavelength be close to that of the first to avoid errors due to quality of emission of the source 10, or variations in the response of detector 19.

The solvent substance need not be liquid and the sample cell 11 could be replaced by a support for thin plates of substance having transmission over at least one part of the ultra-violet visible or infra-red spectrum, impurities could be detected in the substance which showed absorption in part of the transmission spectrum. The substance analysed in fact need not be a liquid nor a solid, but may be a gas or a mixture of gases and vapors provided they have transmission spectra characteristic of their purities or concentration.

A particular advantage of the three wavelength analysis over the two is in applications where it is necessary to analyse substances which contain voids such as holes or bubbles. In virtually all other known infra-red analysers such holes cause large errors, since the spectral distribution and intensity transmitted through the holes differs greatly from the spectrum passed by the substance and its contaminants. Since this analyser can transmit and measure intensities at more than two wavelengths it is easy to choose one which is normally totally absorbed by the solvent substance. Then the presence and intensity of this radiation at the detector is a measure of, and can be used to compensate for the effect of, the holes or bubbles. This method has been used in an analyser using heavy water as the solvent substance in which it was possible that the cell might not be completely full, or in which air bubbles might occur. In this case the $3\mu$ transmission of a sample of heavy water contaminated with light water was compared with the sum of those at $2.6\mu$ and at $4.0\mu$. When the cell was full, no light of $4\mu$ wavelengths emerged and the analysis depended upon the balance between the two $3\mu$ pulses and the one $2.6\mu$ pulse. The presence of a bubble increased the $3\mu$ intensities but made little difference to the $2.6\mu$ pulse since the water was relatively transparent at $2.6\mu$. The bubble also allowed some $4\mu$ radiation through, and the system was adjusted so that this contribution added to the $2.6\mu$ pulse, just compensated for the increased $3\mu$ pulses. The analyser, thus made insensitive to bubbles, continued to give the correct analysis.

In the analyser employing the 2.5, 3.0 and $3.5\mu$ wavelengths described earlier the third wavelength enabled the transmission at the contaminant absorption wavelength to be compared against the transmission on either side of this absorption. The dependence of the apparatus upon the spectrum from the source, the spectral sensitivity of the detector and variations of the transmission properties of the sample was thus minimized, since the intensity of the absorption wavelength was compared with a weighted mean of the intensities at two other wavelengths, one shorter, and one greater than the absorbed wavelength.

To investigate this, let us call $I_a$, $I_s$ and $I_g$ respectively, the intensity of the source within narrow wavelength bands centered at the contaminant, the shorter and the larger wavelength respectively. We can adjust the flux intercepted by the detector for instance by changing the aperture of the filter for the wavelength concerned, or by changing its bandwidth, or by inserting a metallic mesh screen with the filter. Then the fluxes incident on the detector are $A_sI_s$, $A_gI_g$, and $A_iA_aI_a$, where $A_a$, $A_s$ and $A_g$ are factors controlled by the filter apertures, for example, while $A_i$ is the absorption due to the contaminant in the cell.

The voltage pulses, at the integrator are then $V_s$, $V_a$ and $V_g$, proportional to $AA_sI_s$, $A'A_iA_aI_a$ and $AA_gI_g$. The factors $A$ and $A'$ are introduced by the servo driven attenuator to make $$V_s + V_g - 2V_a = 0 \qquad (1)$$

It follows from Planck's radiation formula that if the temperature $T$ of the source changes by $\Delta T$, each intensity $I$ will change by $\Delta I$ where $$\Delta I = I\Delta T/T(1-e^{-x})$$

(where $$x = \frac{ch}{\lambda.kT} = 1.4388 \times 10^4/\lambda T$$

C is the velocity of light, $h$ is Planck's constant and $\lambda$ is the wavelength of the radiation considered).

For $T = 1000°$ C., a typical source temperature, and for $\lambda$ greater than 1 micron, we get $$\frac{\Delta I}{I} = \frac{14.388}{\lambda} \frac{\Delta T}{T} \qquad (2)$$

Hence the voltage pulses change by fractions which are inversely proportional to the wavelengths causing them. Since these changes must not change the balance condition, the voltage pulses must satisfy $$\frac{V_s}{\lambda_s} + \frac{V_g}{\lambda_g} - \frac{2V_a}{\lambda_a} = 0 \qquad (3)$$

as well as Equation 1.

Thus as in the light water analyser described, if $\lambda_s = 2.5\mu$, $\lambda_g = 3.5\mu$ and $\lambda_a = 3\mu$, $A_s$ and $A_g$ would be adjusted to make $V_s$, $V_g$ and $V_a$ in the ratio 5:7:6 or we might have chosen $\lambda_s = 2\mu$, $\lambda_g = 4\mu$, and $\lambda_a = 3\mu$, then $A_s$ and $A_g$ would be adjusted to make $V_s$, $V_g$ and $V_a$ in the ratio 2:4:3. Alternatively the voltages could all be equal if the wavelengths were chosen so that $1/\lambda_s + 1/\lambda_g = 2/\lambda_a$.

In most practical cases, the wavelengths will be chosen so that $\lambda_s$ and $\lambda_g$ are near $\lambda_a$ but are readily transmitted by the sample and relatively insensitive to the impurity. When so chosen, the filters are then adjusted so that Equations 1 and 3 are satisfied.

To make the analyser insensitive to bubbles such as in the heavy water analyser described, one wavelength, $\lambda_b$, is chosen where the sample is opaque. For heavy water, $\lambda_b = 4\mu$ is a good choice with $\lambda_a = 3\mu$ and $\lambda_s = 2.6\mu$. The analysis is performed with $V_s = 2V_a$, $V_b = 0$.

A bubble will then increase $V_a$, $V_s$ and $V_b$ by amounts which depend upon the opacity of the sample at these wavelengths. The adjustment of $A_b$ is made empirically so that the servo balances at its normal operating point with the cell empty (where $A_b$ is a factor similar to $A_a$, $A_s$ and $A_g$ at the sample opacity wavelength). It is true that compensation for bubbles can be obtained exactly at one value of the contaminant. This is not serious in many monitoring applications in which the contaminant normally remains nearly constant; in other cases the method is very valuable in reducing the effect of bubbles.

In one class of applications in which samples of water are inserted manually, the danger of an incompletely filled cell is serious. In such cases the pulses may be displayed on an oscilloscope, when the presence of a $V_b$ pulse warns the operator of the presence of voids or bubbles.

When it is necessary to make the analyser insensitive both to bubbles and to temperature effects, additional wavelengths may be required. The instrument so far described can make use of four wavelengths, by increasing the number of filters and windows in disc 16 of FIGURE 2, even more wavelengths can be obtained at negligible cost. A typical arrangement could have six windows and filters mounted like 12, 13, 14 and 15 and three holes similar to 23 and 25 spaced apart ⅓ of the circumference of flange 28. The two CdS cells would then be spaced ⅙ of the circumference apart, instead of ¼ as shown in FIGURE 2.

We claim:

1. A relay system comprising a two-state relay, a winding for said relay, a source of electric current, first and second photocells connected in series across said source and providing a junction between the two cells, means connecting one side of said relay winding to said junction, at least one charge storage means connected to the other side of said relay winding, illuminating means, and means for alternately illuminating said photocells to permit current to flow alternately through said winding towards and away from said junction thereby causing said relay to change alternately between its two states.

2. A relay system as defined in claim 1 wherein said relay includes a switch for picking one and other of two signals in respective accordance with one and other of the states of the relay, said signals being of a desired form in alternate timed sequence, the alternate illumination of said cells being so timed to place said relay in its required state to permit picking of each said signal when it is of desired form.

3. A relay system as defined in claim 1 wherein said means for illuminating said cells comprises at least one luminous source and an obturator for blocking said cells alternately from illumination by said luminous source.

4. A relay system comprising a two-state relay, a winding for said relay, a source of electric current, first and second photocells connected in series across said source and providing a first junction between the two cells, a charge storing means, said charge storing means including a pair of condensers connected in series across said source and providing a second junction between the condensers, means connecting the relay winding between said junctions, illuminating means, and means for alternately illuminating said photocells to permit current to flow alternately through said winding towards and away from said first junction thereby causing said relay to change alternately between its two states.

References Cited by the Examiner

UNITED STATES PATENTS

| | | | |
|---|---|---|---|
| 1,851,236 | 3/32 | Baseler et al. | 317—127 XR |
| 2,096,902 | 11/37 | Lamb | 317—127 XR |
| 2,125,073 | 7/38 | Knowles | 317—127 XR |
| 2,237,665 | 4/41 | Gulliksen | 317—127 |
| 2,431,899 | 12/47 | Wolf et al. | 317—127 XR |
| 2,916,703 | 12/59 | Stidger | 317—127 XR |
| 2,964,685 | 12/60 | Raymond | 317—124 |

SAMUEL BERNSTEIN, *Primary Examiner.*